United States Patent
Balasubramanian et al.

(10) Patent No.: US 12,197,912 B2
(45) Date of Patent: Jan. 14, 2025

(54) METHODS AND SYSTEMS FOR SCORING QUALITY OF OPEN SOURCE SOFTWARE DOCUMENTATION

(71) Applicant: Open Weaver Inc., Miami, FL (US)

(72) Inventors: Ashok Balasubramanian, Chennai (IN); Karthikeyan Krishnaswamy Raja, Chennai (IN); Meenakshisundaram Chinnappan, Chennai (IN); Lakshmipathy Ganesh Eswaran, Chennai (IN)

(73) Assignee: Open Weaver Inc., Miami, FL (US)

( * ) Notice: Subject to any disclaimer, the term of this patent is extended or adjusted under 35 U.S.C. 154(b) by 102 days.

(21) Appl. No.: 17/680,924

(22) Filed: Feb. 25, 2022

(65) Prior Publication Data
US 2022/0276862 A1    Sep. 1, 2022

Related U.S. Application Data

(60) Provisional application No. 63/154,371, filed on Feb. 26, 2021.

(51) Int. Cl.
*G06F 8/73* (2018.01)
*G06F 8/77* (2018.01)
*G06N 20/00* (2019.01)

(52) U.S. Cl.
CPC .......... *G06F 8/73* (2013.01); *G06F 8/77* (2013.01); *G06N 20/00* (2019.01)

(58) Field of Classification Search
CPC .............. G06F 8/73; G06F 8/77; G06N 20/00
See application file for complete search history.

(56) References Cited

U.S. PATENT DOCUMENTS

| 5,953,526 A | 9/1999 | Day et al. |
| 7,322,024 B2 | 1/2008 | Carlson et al. |

(Continued)

FOREIGN PATENT DOCUMENTS

| CN | 108052442 A | 5/2018 |
| KR | 10-2020-0062917 | 6/2020 |

(Continued)

OTHER PUBLICATIONS

Andreas DAutovic, "Automatic Assessment of Software Documentation Quality", published by IEEE, Ase 2011, Lawrence, Ks, USA, pp. 665-669, (Year: 2011).*

(Continued)

*Primary Examiner* — S. Sough
*Assistant Examiner* — Zheng Wei
(74) *Attorney, Agent, or Firm* — Foley & Lardner LLP

(57) ABSTRACT

Systems and methods of scoring quality of open source software documentation are disclosed. In one aspect, a method includes downloading the open source software project code and documentation of the open source software project code, analyzing the open source software project code and the documentation, parsing the open source software project documentation into sections, validating the sections of the documentation with project or stack metrics, assessing a quality of sections of the documentation, assessing a quality of language of the documentation; and computing the quality score of the documentation based on the assessed quality of sections and assessed quality of language.

21 Claims, 11 Drawing Sheets

(56) References Cited

U.S. PATENT DOCUMENTS

| | | | |
|---|---|---|---|
| 7,703,070 B2 | 4/2010 | Bisceglia | |
| 7,774,288 B2 | 8/2010 | Acharya et al. | |
| 7,958,493 B2 | 6/2011 | Lindsey et al. | |
| 8,010,539 B2 | 8/2011 | Blair-Goldensohn et al. | |
| 8,051,332 B2 | 11/2011 | Zakonov et al. | |
| 8,112,738 B2 | 2/2012 | Pohl et al. | |
| 8,112,744 B2 | 2/2012 | Geisinger | |
| 8,219,557 B2 | 7/2012 | Grefenstette et al. | |
| 8,296,311 B2 | 10/2012 | Rapp et al. | |
| 8,412,813 B2 | 4/2013 | Carlson et al. | |
| 8,417,713 B1 | 4/2013 | Blair-Goldensohn et al. | |
| 8,452,742 B2 | 5/2013 | Hashimoto et al. | |
| 8,463,595 B1 | 6/2013 | Rehling et al. | |
| 8,498,974 B1 | 7/2013 | Kim et al. | |
| 8,627,270 B2 | 1/2014 | Fox et al. | |
| 8,677,320 B2 | 3/2014 | Wilson et al. | |
| 8,688,676 B2 | 4/2014 | Rush et al. | |
| 8,838,606 B1 | 9/2014 | Cormack et al. | |
| 8,838,633 B2 | 9/2014 | Dhillon et al. | |
| 8,935,192 B1 | 1/2015 | Ventilla et al. | |
| 8,943,039 B1 | 1/2015 | Grieselhuber et al. | |
| 9,015,730 B1 | 4/2015 | Allen et al. | |
| 9,043,753 B2 | 5/2015 | Fox et al. | |
| 9,047,283 B1 | 6/2015 | Zhang et al. | |
| 9,135,665 B2 | 9/2015 | England et al. | |
| 9,176,729 B2 | 11/2015 | Mockus et al. | |
| 9,201,931 B2 | 12/2015 | Lightner et al. | |
| 9,268,805 B2 | 2/2016 | Crossley et al. | |
| 9,330,174 B1 | 5/2016 | Zhang | |
| 9,361,294 B2 | 6/2016 | Smith | |
| 9,390,268 B1 | 7/2016 | Martini et al. | |
| 9,471,559 B2 | 10/2016 | Castelli et al. | |
| 9,558,098 B1 | 1/2017 | Alshayeb et al. | |
| 9,589,250 B2 | 3/2017 | Palanisamy et al. | |
| 9,626,164 B1 | 4/2017 | Fuchs | |
| 9,672,554 B2 | 6/2017 | Dumon et al. | |
| 9,977,656 B1 * | 5/2018 | Mannopantar | G06F 11/3616 |
| 10,305,758 B1 | 5/2019 | Bhide et al. | |
| 10,474,509 B1 | 11/2019 | Dube et al. | |
| 10,484,429 B1 | 11/2019 | Fawcett et al. | |
| 10,761,839 B1 | 9/2020 | Migoya et al. | |
| 10,922,740 B2 | 2/2021 | Gupta et al. | |
| 11,023,210 B2 * | 6/2021 | Li | G06F 11/3668 |
| 11,238,027 B2 * | 2/2022 | Frost | G06F 40/30 |
| 11,256,484 B2 * | 2/2022 | Nikumb | G06F 8/38 |
| 11,288,167 B2 | 3/2022 | Vaughan | |
| 11,294,984 B2 | 4/2022 | Kittur et al. | |
| 11,295,375 B1 | 4/2022 | Chitrapura et al. | |
| 11,301,631 B1 | 4/2022 | Atallah et al. | |
| 11,334,351 B1 | 5/2022 | Pandurangarao et al. | |
| 11,461,093 B1 | 10/2022 | Edminster et al. | |
| 11,474,817 B2 | 10/2022 | Sousa et al. | |
| 11,704,406 B2 | 7/2023 | Lee et al. | |
| 11,893,117 B2 | 2/2024 | Segal et al. | |
| 11,966,446 B2 | 4/2024 | Socher et al. | |
| 12,034,754 B2 | 7/2024 | O'Hearn et al. | |
| 2001/0054054 A1 | 12/2001 | Olson | |
| 2002/0059204 A1 | 5/2002 | Harris | |
| 2002/0099694 A1 | 7/2002 | Diamond et al. | |
| 2002/0150966 A1 | 10/2002 | Muraca | |
| 2002/0194578 A1 | 12/2002 | Irie et al. | |
| 2004/0243568 A1 | 12/2004 | Wang et al. | |
| 2006/0090077 A1 | 4/2006 | Little et al. | |
| 2006/0104515 A1 | 5/2006 | King et al. | |
| 2006/0200741 A1 | 9/2006 | Demesa et al. | |
| 2006/0265232 A1 | 11/2006 | Katariya et al. | |
| 2007/0050343 A1 | 3/2007 | Siddarampappa et al. | |
| 2007/0168946 A1 | 7/2007 | Drissi et al. | |
| 2007/0185860 A1 | 8/2007 | Lissack | |
| 2007/0234291 A1 | 10/2007 | Ronen et al. | |
| 2007/0299825 A1 | 12/2007 | Rush et al. | |
| 2009/0043612 A1 | 2/2009 | Szela et al. | |
| 2009/0319342 A1 | 12/2009 | Shilman et al. | |
| 2010/0106705 A1 | 4/2010 | Rush et al. | |
| 2010/0121857 A1 | 5/2010 | Elmore et al. | |
| 2010/0122233 A1 | 5/2010 | Rath et al. | |
| 2010/0174670 A1 | 7/2010 | Malik et al. | |
| 2010/0205198 A1 | 8/2010 | Mishne et al. | |
| 2010/0205663 A1 | 8/2010 | Ward et al. | |
| 2010/0262454 A1 | 10/2010 | Sommer et al. | |
| 2011/0231817 A1 | 9/2011 | Hadar et al. | |
| 2012/0143879 A1 | 6/2012 | Stoitsev | |
| 2012/0259882 A1 | 10/2012 | Thakur et al. | |
| 2012/0278064 A1 | 11/2012 | Leary et al. | |
| 2013/0103662 A1 | 4/2013 | Epstein | |
| 2013/0117254 A1 | 5/2013 | Manuel-Devadoss et al. | |
| 2013/0254744 A1 | 9/2013 | Sahoo et al. | |
| 2013/0326469 A1 | 12/2013 | Fox et al. | |
| 2014/0040238 A1 | 2/2014 | Scott et al. | |
| 2014/0075414 A1 | 3/2014 | Fox et al. | |
| 2014/0122182 A1 | 5/2014 | Cherusseri et al. | |
| 2014/0149894 A1 | 5/2014 | Watanabe et al. | |
| 2014/0163959 A1 | 6/2014 | Hebert et al. | |
| 2014/0188746 A1 | 7/2014 | Li | |
| 2014/0297476 A1 | 10/2014 | Wang et al. | |
| 2014/0331200 A1 * | 11/2014 | Wadhwani | G06Q 10/06395 717/101 |
| 2014/0337355 A1 | 11/2014 | Heinze | |
| 2015/0127567 A1 | 5/2015 | Menon et al. | |
| 2015/0220608 A1 | 8/2015 | Crestani Campos et al. | |
| 2015/0331866 A1 | 11/2015 | Shen et al. | |
| 2015/0378692 A1 | 12/2015 | Dang et al. | |
| 2016/0253688 A1 | 9/2016 | Nielsen et al. | |
| 2016/0350105 A1 | 12/2016 | Kumar et al. | |
| 2016/0378618 A1 | 12/2016 | Cmielowski et al. | |
| 2017/0034023 A1 | 2/2017 | Nickolov et al. | |
| 2017/0063776 A1 | 3/2017 | Nigul | |
| 2017/0154543 A1 | 6/2017 | King et al. | |
| 2017/0177318 A1 | 6/2017 | Mark et al. | |
| 2017/0220633 A1 | 8/2017 | Porath et al. | |
| 2017/0242892 A1 | 8/2017 | Ali et al. | |
| 2017/0286541 A1 | 10/2017 | Mosley et al. | |
| 2017/0286548 A1 | 10/2017 | De et al. | |
| 2017/0344556 A1 | 11/2017 | Wu et al. | |
| 2018/0046609 A1 | 2/2018 | Agarwal et al. | |
| 2018/0067836 A1 | 3/2018 | Apkon et al. | |
| 2018/0107983 A1 | 4/2018 | Tian et al. | |
| 2018/0114000 A1 | 4/2018 | Taylor | |
| 2018/0189055 A1 | 7/2018 | Dasgupta et al. | |
| 2018/0191599 A1 | 7/2018 | Balasubramanian et al. | |
| 2018/0329883 A1 | 11/2018 | Leidner et al. | |
| 2018/0349388 A1 | 12/2018 | Skiles et al. | |
| 2019/0026106 A1 | 1/2019 | Burton et al. | |
| 2019/0229998 A1 | 7/2019 | Cattoni | |
| 2019/0278933 A1 | 9/2019 | Bendory et al. | |
| 2019/0286683 A1 | 9/2019 | Kittur et al. | |
| 2019/0294703 A1 | 9/2019 | Bolin et al. | |
| 2019/0303141 A1 | 10/2019 | Li et al. | |
| 2019/0311044 A1 | 10/2019 | Xu et al. | |
| 2019/0324981 A1 | 10/2019 | Counts et al. | |
| 2020/0097261 A1 | 3/2020 | Smith et al. | |
| 2020/0110839 A1 | 4/2020 | Wang et al. | |
| 2020/0125482 A1 | 4/2020 | Smith et al. | |
| 2020/0133830 A1 | 4/2020 | Sharma et al. | |
| 2020/0293354 A1 | 9/2020 | Song et al. | |
| 2020/0301672 A1 * | 9/2020 | Li | G06F 11/3608 |
| 2020/0301908 A1 * | 9/2020 | Frost | G06F 16/285 |
| 2020/0348929 A1 | 11/2020 | Sousa et al. | |
| 2020/0356363 A1 | 11/2020 | Dewitt et al. | |
| 2021/0049091 A1 | 2/2021 | Hikawa et al. | |
| 2021/0065045 A1 | 3/2021 | Kummamuru et al. | |
| 2021/0073293 A1 | 3/2021 | Fenton et al. | |
| 2021/0081189 A1 | 3/2021 | Nucci et al. | |
| 2021/0081418 A1 | 3/2021 | Silveira et al. | |
| 2021/0141863 A1 | 5/2021 | Wu et al. | |
| 2021/0149658 A1 | 5/2021 | Cannon et al. | |
| 2021/0149668 A1 | 5/2021 | Gupta et al. | |
| 2021/0256367 A1 | 8/2021 | Mor et al. | |
| 2021/0303989 A1 | 9/2021 | Bird et al. | |
| 2021/0349801 A1 | 11/2021 | Rafey | |
| 2021/0357210 A1 | 11/2021 | Clement et al. | |
| 2021/0382712 A1 | 12/2021 | Richman et al. | |
| 2021/0397418 A1 * | 12/2021 | Nikumb | G06F 40/295 |
| 2021/0397546 A1 | 12/2021 | Cser et al. | |

(56) References Cited

U.S. PATENT DOCUMENTS

| | | |
|---|---|---|
| 2022/0012297 A1 | 1/2022 | Basu et al. |
| 2022/0083577 A1 | 3/2022 | Yoshida et al. |
| 2022/0107802 A1 | 4/2022 | Rao et al. |
| 2022/0197916 A1 | 6/2022 | Sarkar et al. |
| 2022/0215068 A1 | 7/2022 | Kittur et al. |
| 2023/0308700 A1 | 9/2023 | Perez |

FOREIGN PATENT DOCUMENTS

| | | |
|---|---|---|
| WO | WO-2007/013418 A1 | 2/2007 |
| WO | WO-2020/086773 A1 | 4/2020 |

OTHER PUBLICATIONS

M. Squire, "Should We Move to Stack Overflow?" Measuring the Utility of Social Media for Developer Support, 2015 IEEE/ACM 37th IEEE International Conference on Software Engineering, Florence, Italy, 2015, pp. 219-228, doi: 10.1109/ICSE.2015.150. (Year: 2015).

S. Bayati, D. Parson, T. Sujsnjak and M. Heidary, "Big data analytics on large-scale socio-technical software engineering archives," 2015 3rd International Conference on Information and Communication Technology (ICoICT), Nusa Dua, Bali, Indonesia, 2015, pp. 65-69, doi: 10.1109/ICoICT.2015.7231398. (Year: 2015).

Iderli Souza, An Analysis of Automated Code Inspection Tools for PHP Available on Github Marketplace, Sep. 2021, pp. 10-17 (Year: 2021).

Khatri et al., "Validation of Patient Headache Care Education System (PHCES) Using a Software Reuse Reference Model", Journal of System Architecture, pp. 157-162 (Year: 2001).

Lotter et al, "Code Reuse in Stack Overflow and Popular Open Source Java Projects", IEEE, pp. 141-150 (Year: 2018).

Rothenberger et al, "Strategies for Software Reuse: A Principal Component Analysis of Reuse Practices", IEEE, pp. 825-837 (Year:2003).

Tung et al, "A Framework of Code Reuse in Open Source Software", ACM, pp. 1-6 (Year: 2014).

Lampropoulos et al, "REACT—A Process for Improving Open-Source Software Reuse", IEEE, pp. 251-254 (Year: 2018).

Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.

Schweik et al, Proceedings of the OSS 2011 Doctoral Consortium, Oct. 5, 2011, Salvador, Brazil, pp. 1-100, Http:/Avorks.bepress.com/charles_schweik/20 (Year: 2011).

Stanciulescu et al, "Forked and Integrated Variants in an Open-Source Firmware Project", IEEE, pp. 151-160 (Year: 2015).

Zaimi et al, ":An Empirical Study on the Reuse of Third-Party Libraries in Open-Source Software Development", ACM, pp. 1-8 (Year: 2015).

Chung-Yang et al. "Toward Since-Source of Software Project Documented Contents: A Preliminary Study", [Online], [Retrieve from Internet on Sep. 28, 2024], https://www.proquest.com/openview/c15dc8b34c7da061fd3ea39f1875d8e9/1?pq-origsite=gscholar&cbl=237699 (Year: 2011).

S. Bayati, D. Parson, T. Susnjakand M. Heidary, "Big data analytics on large-scale socio-technical software engineering archives," 2015 3rd International Conference on Information and Communication Technology (ICoICT), Nusa Dua, Bali, Indonesia, 2015, pp. 65-69, doi:1 0.1109/ICoICT.2015.7231398. (Year: 2015).

\* cited by examiner

METHODS AND SYSTEMS FOR SCORING QUALITY OF OPEN SOURCE SOFTWARE DOCUMENTATION

CROSS-REFERENCE TO RELATED PATENT APPLICATION

This application claims the benefit of and priority to U.S. Provisional Patent Application No. 63/154,371 filed Feb. 26, 2021, the entire disclosure of which is incorporated by reference herein.

TECHNICAL FIELD

The present disclosure relates to methods and systems for scoring the quality of documentation available for open source software components. This helps users to understand the maturity of available documentation to help while implementation of the open source software components.

BACKGROUND

Application development is increasingly turning towards using cloud and open source components to build applications faster. There is a multitude of open source software components available in major open-source package managers and repositories. However, to use these open source software components, implement them and support the applications, technical documentation is very, much important.

Thus, quality of the technical documentation is also very important for understanding the implementation and support of the software components. The documentation is an indicator of perceived quality of an open source software component. It is a time-consuming process to implement any open-source software component without having a good documentation. Hence for a developer looking to consume the component, it is very useful to know about the documentation maturity level beforehand.

Currently, there is a lack in measuring the qualitative aspect of the documentation. Merely having the documentation and the corresponding sections are not enough but content of the documentation needs to be in relevance for the software usage. The content should not be confusing and incomplete. The documentation should have enough coverage, clarity, completeness, and consistency to be useful.

SUMMARY

There is provided a method and system for generating a quality score of an open source software project documentation. According to a method of the present subject matter, the open source software project code and its documentation of the open source software project code is downloaded. Further, the open source software project code and the documentation is analyzed. Thereafter, the open source software project documentation is parsed into sections. Then the sections of the documentation is validated with project or stack metrics. Further, the method comprises assessing a quality of sections of the documentation. Also, a quality of language of the documentation is assessed. Finally, the quality score of the documentation is computed based on the assessed quality of sections and assessed quality of language.

The downloading the open source software project code and documentation comprises connecting to a source code repository and a documentation site of the documentation and downloading the source code and the documentation. The documentation may be then validated.

In some embodiments, the analyzing the project code and documentation comprises calculating the software project source code metrics and identifying project technology stack.

In an embodiment, parsing the open source software project documentation into sections comprises using natural language processing techniques to identify section headings and a section content of the documentation and mapping the sections to a system defined standard structure model for the open source software project's identified technology stack.

In an embodiment, validating the document sections with project or stack metrics further comprises fetching the system defined standard structure model for the open source software project's identified technology stack, comparing the parsed document sections to a standard list and identifying mapping compliance, and scoring the open source project documentation for compliance to expected sections as per the system defined standard structure model.

In yet another embodiment, wherein assessing the document open source software project section's quality further comprises connecting to a source code repository and a documentation site of the documentation, downloading the source code and the documentation, and validating the documentation.

According to an example embodiment, analyzing the project code and the documentation further comprises calculating the software project source code metrics and identifying a project technology stack.

According to an example embodiment, parsing the open source software project documentation into sections comprises using natural language processing techniques to identify section headings and a section content of the documentation and mapping the sections to a system defined standard structure model for the open source software project's identified technology stack.

In an embodiment, validating the document sections with project or stack metrics further comprises fetching the system defined standard structure model for the open source software project's identified technology stack, comparing the parsed document sections to a standard list and identifying mapping compliance, and scoring the open source project documentation for compliance to expected sections as per the system defined standard structure model.

In an example embodiment, assessing the document open source software project section's quality further comprises comparing the section content's intention against a corresponding heading's intention, evaluating a quality of the section content to determine a section quality score of section content, assessing a flow of the documentation to determine a flow score of the documentation, wherein the flow score indicates how well the documentation is structured, evaluating a consistency of usage of terminologies and readability in the documentation to determine terminologies and readability score in the documentation, wherein the terminologies and readability score indicates about consistency of usage of terminologies and readability of the document, and evaluating completeness of expected sections to determine a completeness of expected sections score of the documentation, wherein the completeness of expected sections score indicates level of completeness of the expected sections.

In another embodiment, parsing the open source software project documentation into sections comprises using natural language processing techniques to identify section headings and a section content of the documentation and mapping the sections to a system defined standard structure model for the open source software project's identified technology stack.

In an aspect, a system for determining a quality score of an open source software project documentation is disclosed, the system comprising: one or more processors and memory storing instructions that, when executed by the one or more processors, cause the one or more processors to perform operations comprising: downloading the open source software project code and documentation of the open source software project code; analyzing the open source software project code and the documentation; parsing the open source software project documentation into sections; validating the sections of the documentation with project or stack metrics; assessing a quality of sections of the documentation; assessing a quality of language of the documentation; and computing the quality score of the documentation based on the assessed quality of sections and assessed quality of language.

In some embodiments, the operations further comprise: creating a web form for accepting details of the open source software project, wherein the details include name and repository address of the open source software project; receiving the details, a remote location uniform resource locator (URL) of the open source software project source code, and the documentation of the open source software project source code; and receiving a user email address for sending a notification of the quality score of the documentation.

In some embodiments, the operations further comprise: reading, via natural language processing, the documentation; parsing the documentation into a document structure having different sections; assessing each section of the documentation to determine a section quality score of each section of the documentation; and determining the quality score of the documentation based on the section quality score of all sections.

In some embodiments, the operations further comprise: preparing training data from documentations of pre-validated open source software projects for different levels of documentation quality, the levels being a low quality, a medium quality, and a high quality, wherein pre-validated open source software projects are well known open source software projects; preparing the training data with the sections of documentation mapped to a system defined standard structure model; and training, using machine learning algorithm, a machine learning model.

In some embodiments, the operations further comprise: extracting a section heading of a section of the documentation and map the section heading to the system defined standard structure model to identify the section heading; and validating the content of the section to map relevance of content to the mapped section's expected content coverage.

In some embodiments, the operations further comprise: assessing a flow of the documentation and documentation sections by comparing the sections of the documentation with pre-validated documentations to allot a flow score to the documentation that indicates how well the documentation is structured; evaluating a consistency of usage of terminologies and readability of the documentation to allot a terminologies and readability score to the documentation, the readability score indicating consistency of usage of terminologies and readability of the document; and evaluating completeness of sections in the documentation based on the system defined standard structure model to allocate completeness of sections score to the documentation, the completeness of sections score indicating a level of completeness of the expected sections.

In some embodiments, the operations further comprise: evaluating sentences of the documentation to determine an ease of understandability score of the documentation, wherein the ease of understandability score indicates easiness in understating the documentation; evaluating the sentences to determine a clarity score of the documentation, wherein the clarity score indicates degree of clarity of subject matter the documentation; and normalize the ease of understandability score and clarity score based on the section intended coverage.

In some embodiments, the operations further comprise: identifying pre-validated open source software projects having good quality documentation; analyzing the open source software project's source code to generate the source code metrics; and creating a machine learning model trained with the documentation of the pre-validated projects and the source code metrics.

In some embodiments, the operations further comprise: preparing the training data using documentation of the pre-validated open source software projects under different sections; preparing the training data with documentation sections mapped to the system define standard structure model; and training, via the machine learning algorithm, the data to create the machine learning model.

In some embodiments, the operations further comprise: pre-processing a documentation section; predicting a section category with the pre-processed documentation section; and comparing the section predicted category section with the provided section heading in the documentation to calculate a section intent match score.

In some embodiments, the operations further comprise: providing different software connectors to the different sources of open source software project information; and providing database and file storage integration services for other processing services to fetch and write data.

Another aspect is a method of automatically determining a quality score of a documentation of an open source software project, the method comprising steps of: downloading the open source software project code and the documentation of the open source software project code; analyzing the open source software project code and the documentation; parsing the open source software project documentation into sections; validating the sections of the documentation with project or stack metrics; assessing a quality of sections of the documentation; assessing a quality of language of the documentation; and computing the quality score of the documentation based on the assessed quality of sections and assessed quality of language.

In some embodiments, the downloading the open source software project code and documentation comprises: connecting to a source code repository and a documentation site of the documentation; downloading the source code and the documentation; and validating the documentation.

In some embodiments, analyzing the project code and the documentation further comprises: calculating the software project source code metrics; and identifying a project technology stack In some embodiments, parsing the open source software project documentation into sections comprises: identifying, via natural language processing, section headings and a section content of the documentation; and mapping the sections to a system defined standard structure model for the open source software project's identified technology stack.

In some embodiments, validating the document sections with project or stack metrics comprises: fetching the system defined standard structure model for the open source software project's identified technology stack; comparing the parsed document sections to a standard list; identifying mapping compliance; and scoring the open source project documentation for compliance to expected sections as per the system defined standard structure model.

In some embodiments, assessing the document open source software project section's quality comprises: comparing the section content's intention against a corresponding heading's intention; evaluating a quality of the section content to determine a section quality score of section content; assessing a flow of the documentation to determine a flow score of the documentation, wherein the flow score indicates how well the documentation is structured; evaluating a consistency of usage of terminologies and readability in the documentation to determine terminologies and readability score in the documentation, wherein the terminologies and readability score indicates about consistency of usage of terminologies and readability of the document; and evaluating completeness of expected sections to determine a completeness of expected sections score of the documentation, wherein the completeness of expected sections score indicates level of completeness of the expected sections.

In some embodiments, assessing the document's language quality comprises: evaluating sentences of the documentation to determine ease of understandability score of the documentation, wherein the ease of understandability score indicate easiness in understating the documentation; evaluating the sentences to determine clarity score, wherein the clarity score indicates degree of clarity of subject matter of the documentation; and normalizing ease of understandability score and the clarity score based on the section intended coverage.

In some embodiments, computing the quality score of the documentation comprises: fetching the section quality score, the flow score, the terminologies and readability score, completeness of expected sections score, the ease of understandability score, the clarity score; and consolidating quality score, the flow score, the terminologies and readability score, completeness of expected sections score, the ease of understandability score, the clarity score with pre-defined weights to determine the open source software project's documentation quality score.

In some embodiments, assessing the document's language quality comprises: evaluating sentences of the documentation to determine ease of understandability score of the documentation, wherein the ease of understandability score indicate easiness in understating the documentation; evaluating the sentences to determine clarity score, wherein the clarity score indicates degree of clarity of subject matter of the documentation; and normalizing ease of understandability score and the clarity score based on the section intended coverage.

Another aspect is one or more non-transitory computer-readable media for determining a quality score of an open source software project documentation, the computer-readable media storing instructions thereon, wherein the instructions when executed by one or more processors cause the one or more processors to download the open source software project code and the documentation of the open source software project code; analyze the open source software project code and the documentation; parse the open source software project documentation into sections; validate the sections of the documentation with project or stack metrics; assess a quality of sections of the documentation; assess a quality of language of the documentation; and compute the quality score of the documentation based on the assessed quality of sections and assessed quality of language.

BRIEF DESCRIPTION OF THE DRAWINGS

Like reference numbers and designations in the various drawings indicate like elements.

Figure 1:
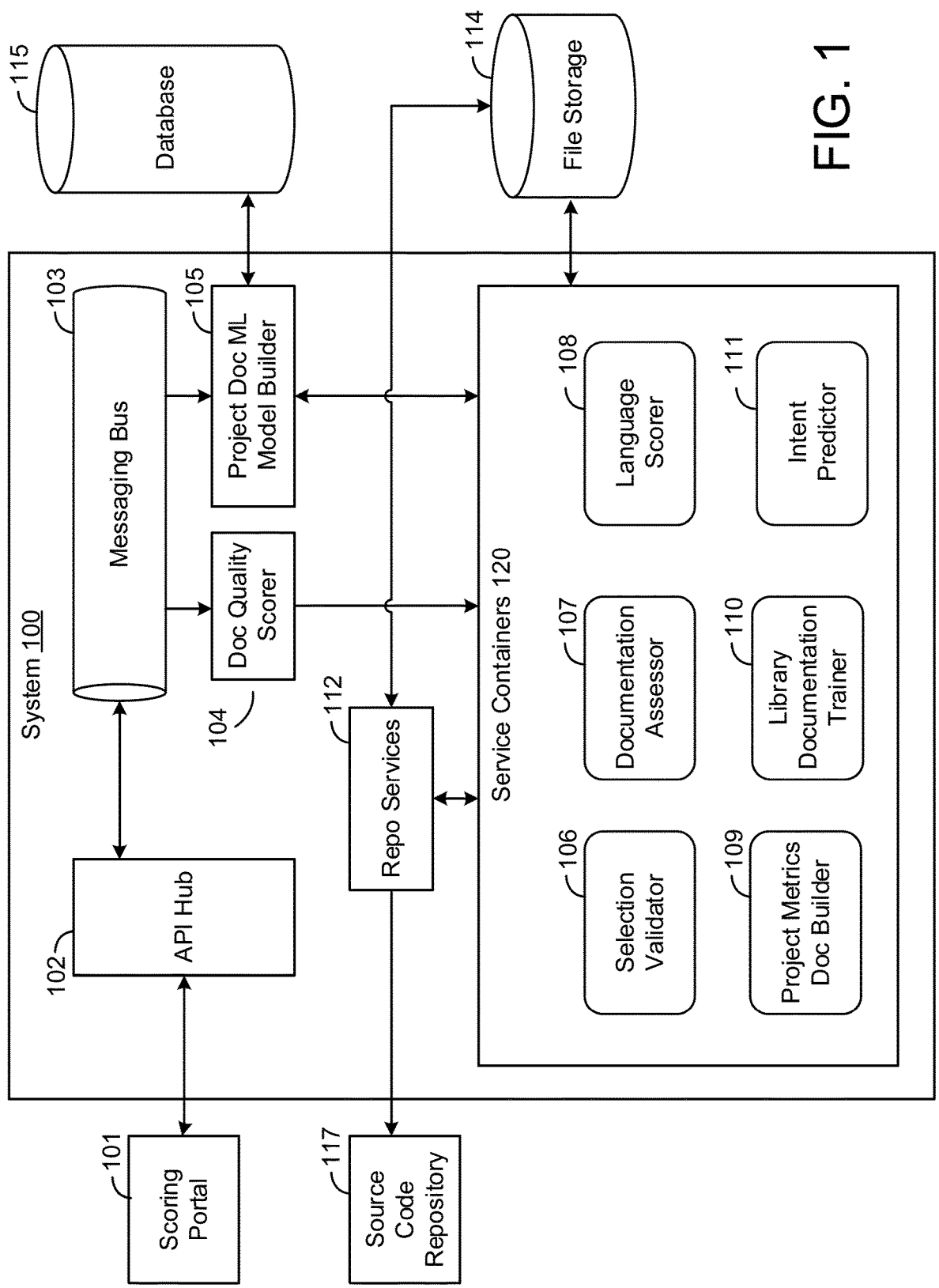
FIG. 1 shows an example system architecture that generates a quality score for open source software projects documentation, according to some embodiments.

Persons skilled in the art will appreciate that elements in the figures are illustrated for simplicity and clarity and may represent both hardware and software components of the system. Further, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

Exemplary embodiments now will be described. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The present subject matter discloses a system and method that evaluates a quality of a documentation of an open source software project and creates a quality score for the same. The present subject matter uses machine learning models and natural language processing models for evaluating different sections of the documentation to determine relevance, completeness, and ease of understanding of the documentation. Further, a source code and tech stack information of the documentation is determined. The tech stack information include details, such as size of the source code and number of the application technology stacks, their type and counts. These details are used as major features to compare them against similar tech domain projects to assess the documentation's quality. With the machine learning models, the expected coverage of documentation topics and the depth of explanation is obtained. Similar tech domain open source software projects are pre-selected for their established quality of documentation and are used to train the machine learning models for evaluating the documentation for other open source software projects. The documentation flow is checked for coherence and consistency of technology terminologies used to refer the project's subsystems.

FIG. 1 shows an example system 100 that generates a quality score for a documentation of open source software projects, in accordance with some embodiments. Briefly, and as described in further detail below, the system 100 comprises an application programming interface (API) hub 102, a messaging bus 103, a doc quality scorer 104, and a project doc ML model builder 105. The system 100 includes service containers 120 which include a section validator 106, a documentation assessor 107, a language scorer 108, a project metrics doc builder 109, a library documentation trainer 110, and an intent predictor 111. The system 100 also includes a repo services 112, a file storage 114, a database 115, and a scoring portal 101, which are a unique set of components to perform the task of calculating the quality score of open source software project documentation. The service containers 120 may include additional services that are not shown in FIG. 1.

In the embodiment shown in FIG. 1, a primary functional block of the present subject matter comprises of a project information graphical user interface (GUI) portal (or scoring portal) 101 which has a user interface for a user to interface with the system 100 for submitting requests to get the quality score of the open source software project documentation. The GUI portal 101 can also be used to view status of the request. The GUI portal 101 provides a web form to the user. The web form may be used to enter the open source software project details such as project name, project repository details, documentation details, notification email and a submit button to raise the request to perform the ecosystem scoring analysis. Once submitted, the user can also view the status of the submitted request on the GUI portal 101. In an example, the system 100 may also send an email notification to the user when the processing of the request is completed and the quality score of the documentation is generated. The user can access the quality score from a display (not shown in the figure).

The submitted request from GUI portal 101 goes to the API hub 102 which acts as a gateway for accepting all web service requests from the portal. The API hub 102 hosts the web services for taking the requests from users and creating request messages to be put into the messaging bus 103. In an example, the user may fill up a web-form for providing details about the open source software project. In another example, the user may provide a uniform resource locator (URL) of the open source software project. The messaging bus 103 provides for event driven architecture thereby enabling long running processes such as the reuse scoring to be decoupled from requesting system's calls. This decoupling will help the system 100 to service the request and notify user once the entire process of calculating the quality score of the documentation is completed. There are job listeners configured to listen to the messages in the messaging bus 103. Different type of messages may trigger different jobs.

The doc quality scorer 104 is responsible for calculating the quality score of the documentation. To calculate the quality score of the documentation, the doc quality scorer 104 first parses the documentation and creates a structure of the documentation by dividing the documentation into standardized sections. Thereafter, the doc quality scorer 104 calls individual services to assess quality of each section to determine a section quality score of each section. The doc quality scorer 104 thereafter saves the section quality score to the database 114. Once the section quality scores for all the sections are calculated, the doc quality scorer 104 applies a weighted importance function to calculate the quality score of documentation.

The project doc Machine Learning (ML) model builder 105 component is responsible for creating the different machine learning models that can be used to evaluate the documentation and content of its section. The project doc ML model builder 105 takes the pre-validated and labelled open source software project data to prepare the training data. The pre-validated open source software projects are such software projects which are well known in the domain. The open source software projects are also labelled with different categories of quality, like high quality, medium quality, and low quality. This data is then used to train with machine learning algorithm to create the trained models to predict the different attribute of document sections like compliance, category and others.

The section validator 106 is used to validate the parsed documentation section. It extracts section headings from the documentation and maps the extracted section headings to a system defined standard structure model to identify corresponding section. The sections include but not limited to readme, description, setup, build, deployment, FAQs, 'How-To' Instructions, license. The system defined standard structure model define a standard section structure of a document. Thereafter, the section validator 106 validates content of the sections to map relevance of content to the mapped section expected content coverage. The relevance is then converted to a relevance score and saved in the database 115.

The documentation assessor 107 is used to assess the overall quality of the documentation. It assesses the documentation flow and documentation sections by comparing it against pre-validated or generated documentations trained models with the machine learning algorithms. The documentation assessor 107 also determine the consistency of usage of terminologies and readability using natural language processing techniques. Based on the determination the document assessor 107 may allot terminologies and readability score and a flow score for the documentation. Further, the completeness of expected sections in the documentation is also evaluated based on the system define standard structure model. Based on the evaluation, a completeness of expected sections score may be determined. The above determined terminologies and readability score, the flow score, and the completeness of expected sections scores are saved in the database 115.

The language scorer 108 is used to evaluate the sentences of the documentation for ease of understanding and clarity by using natural language techniques. Based on the evaluation, an ease of understandability score and a clarity score is determined. The ease of understandability score and the clarity score are normalized for all the sections based on the section intended coverage and the section's overall length and contribution to the documentation.

The project metrics doc builder 109 creates machine learning models trained with pre-selected project's documentation and its source code. The training data is from the projects which are validated for their good documentation quality. In an example, the project metrics builder 109 extracts details from various documentation having good quality scores. The details may be about the structure of the documentation, language used in the documentation, clarity of the documentation, ease of the understanding of the documentation etc. Such details may comprises the training data for generating machine learning models. The training data is prepared with the parsed documentation to the system defined standard structure model for each technology stack and the open source software projects source code metrics.

The library documentation trainer 110 creates a machine learning model trained with the documentation sections and the defined section headings. It prepares the training data with documentation from pre-validated open source software projects under different sections and runs the machine learning algorithms to train the model.

The intent predictor 111 uses the model created by the library documentation trainer 110 to predict the relevance of a section of the documentation to its given heading. The intent predictor 111 processes the documentation section using natural language processing techniques and predicts the section category with the pre-processed content. Thereafter, the section predicted category section is compared with the provided section heading in the document to calculate a section intent match score.

The repo services 112 provides the different connectors to the different sources of project information. Further, the repo services also provides database and file storage integration services for other processing services to fetch and write data.

Figure 2:
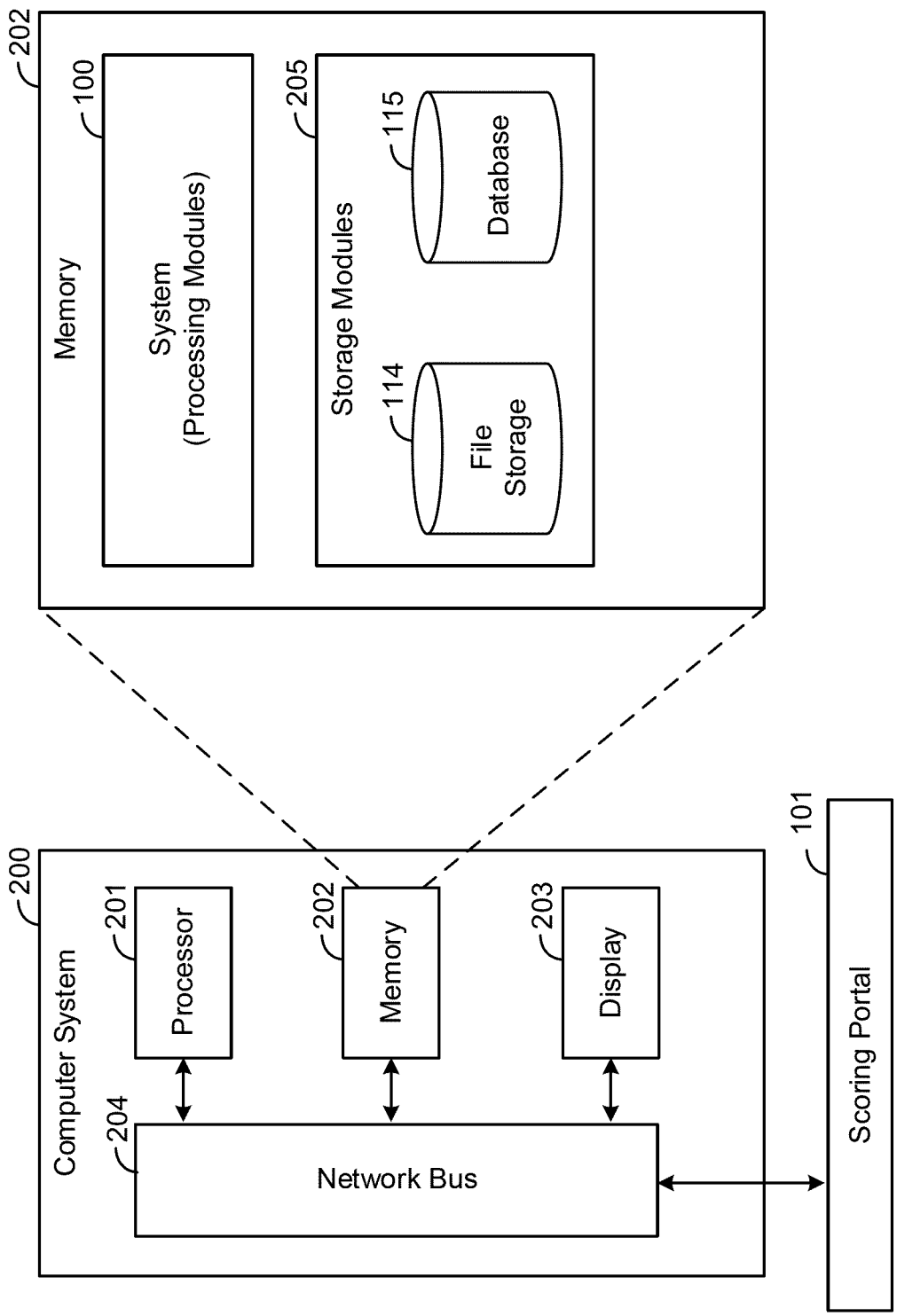
FIG. 2 shows an example computer system for generating the quality score for open source software projects documentation, according to some embodiments.

FIG. 2 shows an example computer system 200 for generating the quality score for open source software project's documentation, in accordance with some embodiments. The computer system 200 may include a processor 201, memory 202, display 203, network bus 204, and other input/output like a microphone, speaker, wireless card etc. The system 100, file storage 114, database 115, are stored in the memory 202 which provides the necessary machine instructions to the processor 201 to perform the method for calculating the quality score of the documentation. In example embodiments, the processor 201 controls the overall operation of the system 100 and manages the communication between the memory 202, processor 201, and the display 203 through the network bus 204. The memory 202 holds the documentation quality measurement system code, data and instructions of the system 100. In an example, the memory maybe a non-volatile memory, such as flash memory, ferroelectric random-access memory (FeRAM), magnetic random-access memory (MRAM), phase-change memory (PCM), and resistive random-access memory (RRAM) etc. In another example, the memory may be a volatile memory, such as random access memory (RAM), static RAM (SRAM), dynamic RAM (DRAM) etc. The GUI portal 101 interacts with the computer system via the network bus 204.

Figure 3:
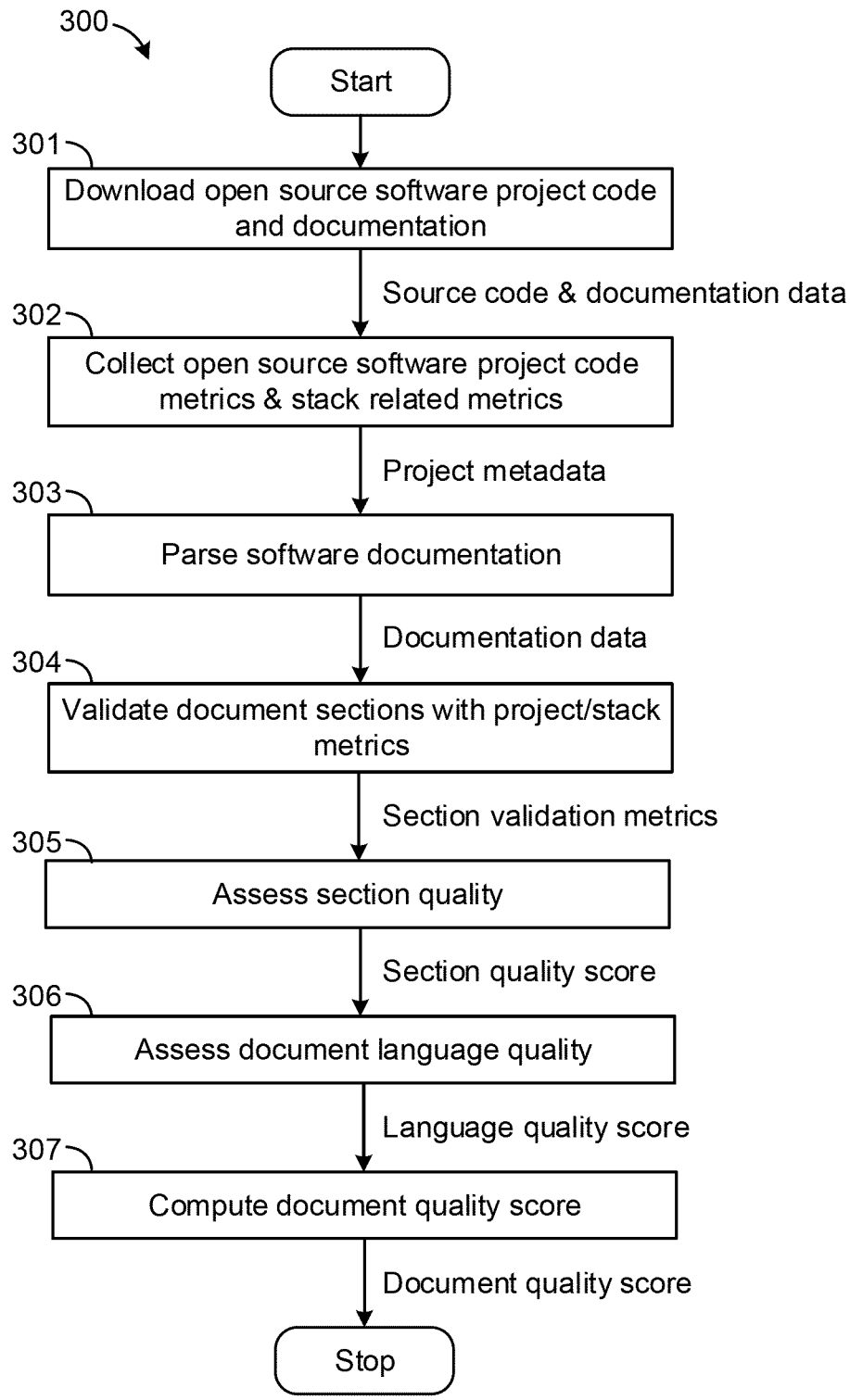
FIG. 3 shows an example process flow to generate a quality score for the documentation of an open source software projects, according to some embodiments.

FIG. 3 shows an example method 300 to generate a quality score for the documentation of an open source software projects, in accordance with some embodiments. It should be understood that the method steps are shown as a reference only and sequence of the method steps should not be construed as limitation. The method steps can include any additional steps in any order. Although, the method 300 may be implemented in any system, the example method 300 is provided in reference to the system 100 for ease of explanation.

At step 301, an open source software project code and the documentation corresponding to the open source software project is downloaded. In an example, a system such as the system 100 may perform the step 301. The system 100 connects to a source code repository and documentation site of the open source software project and downloads the source code and documentation of the open source software project. The source code and the documentation are validated and then stored in the database 115.

At step 302, the open source software project code size is collected and the project source code metrics are collected. The metrics of the code may include details, such as lines of code, number of functions, complexity, number of screens, deployment end points and others. The open source software project's technology stack is also identified from the documentation as well as from the source code.

In step 303, the documentation is parsed and analysed using natural language processing techniques to identify section headings and the section content. The sections are thereafter mapped to the system defined standard structure model for the open source software project's identified technology stack.

In step 304, the sections of the documentation with project or stack metrics is validated. To validate the sections, the system defined standard structure model for the project's identified technology stack is fetched and compared with the parsed document sections. This is done to identify mapping compliance to create the compliance score for compliance to expected sections per the system defined standard structure model.

In step 305, a quality of the sections of the documentation is assessed. To assess the quality of the documentation, the documentation section content's intention against the heading intention is evaluated and a compliance score is calculated. Further, the section content quality is assessed with natural language techniques and a section score is calculated. Also, the overall documentation flow is assessed with natural language techniques and machine learning to assess the overall documentation flow. The natural language techniques are used to determine consistency of terminologies and readability score, flow score, section quality score, and completeness of expected sections score of the etc.

In step 306, a quality of language of the documentation of determined. To determine the quality of language of the documentation, the document sentences are grouped by the sections and evaluated for ease of understanding, clarity etc. The ease of understandability score and clarity score are allotted for the documentation and the ease of understandability score and clarity score are normalized for different sections based on the section intended coverage and the section length.

In step 307, document quality score is calculated. To calculate the document quality score, the flow score, the terminologies and readability score, completeness of expected sections score, the ease of understandability score, the clarity score, are consolidated. The above mentioned scores are consolidated with pre-defined importance weights to arrive at the quality score of open source software project's documentation.

The document quality score calculated for a documentation helps the developer to make a decision for choosing appropriate libraries and helps them determine whether or not to use that library/software component for building software applications. It also helps the developer better understand the code that they are downloading and using. Depending on the document quality score, the system may suggest other open source libraries that was developed by the same developer who created the one that was analyzed. It then may suggest the user the most suitable one among these based on the ecosystem activity score by providing the suggestion and/or recommendation via the user terminal (e.g., project information portal 101).

Figure 4:
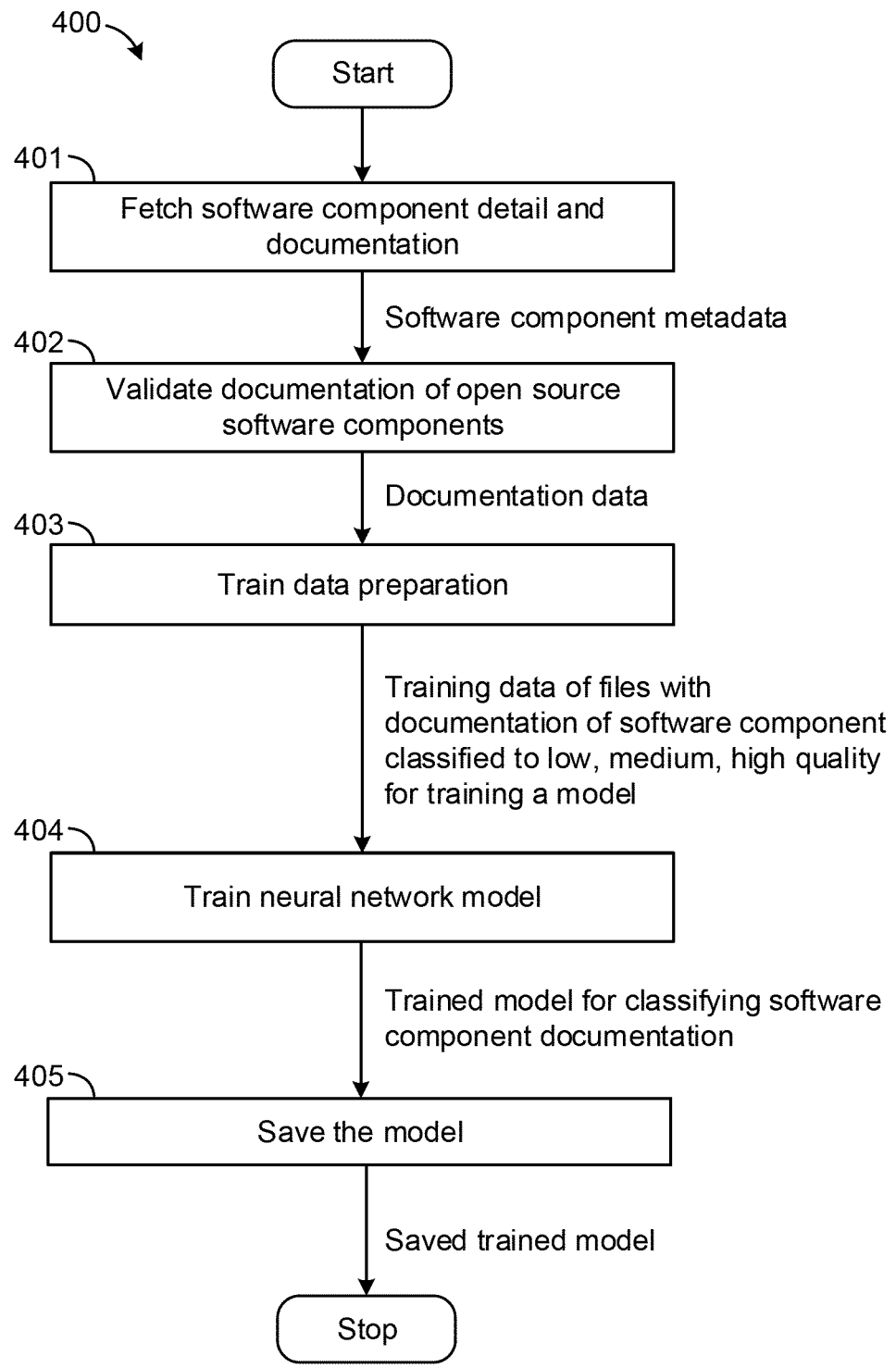
FIG. 4 shows an example process flow to generate a model by a project doc ML model builder in an example implementation, according to some embodiments.

FIG. 4 shows an example method 400 to generate a model by a project doc ML model builder, such as the project doc ML builder 105, in accordance with some embodiments. It should be understood that the method steps are shown as a reference only and sequence of the method steps should not be construed as limitation. The method steps can include any additional steps in any order. Although, the method 400 may be implemented in any system, the example method 400 is provided in reference to the system 100 for ease of explanation.

The project doc ML model builder 105 interacts with many other services and helps in training a ML model for predicting documentation quality of the open source software component. At step 401, details, documentation, and metadata of the software component is fetched from the project repository. To retrieve the details, documentation, and metadata from the project repository, the project doc ML builder connects with the project repository and downloads the documentation. In step 402, the documentation is validated to identify the availability of necessary sections of documentation. Once the documentation is validated, the repository documentation data is annotated to categories of high, low and medium quality documentation. This constitutes the data preparation for model training which is step 403. The annotated data serves as the knowledge base or training data for ML model training. The training data prepared in the step 403 is used to train a neural network model which serves the purpose of classifying a documentation quality to be high, medium or low in the step 404. The neural network model generates a machine learning model which analyzes a software documentation document and provides the quality of documentation as output. The built ML model from step 404 is saved in the storage in step 405 for further usage.

Figure 5:
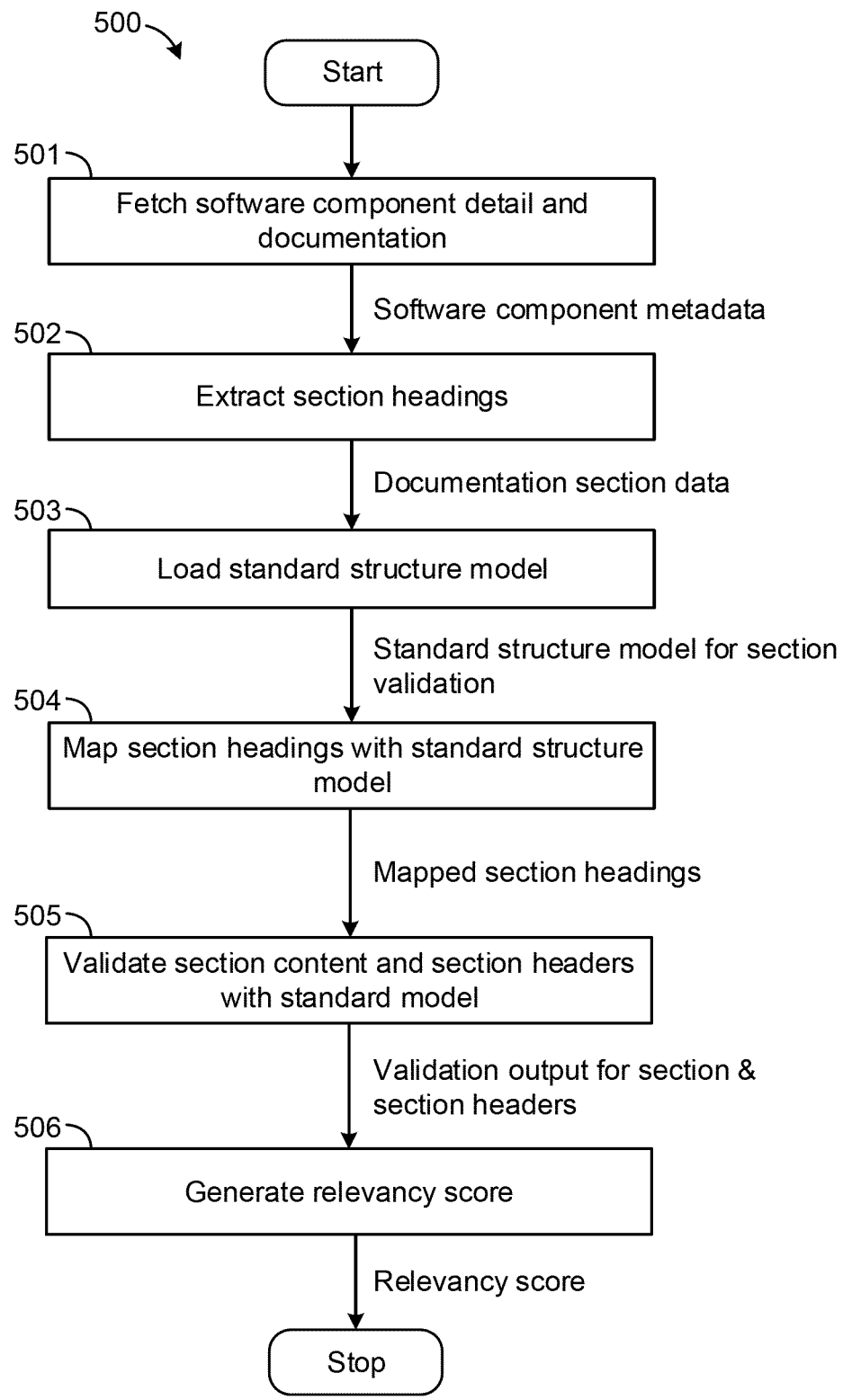
FIG. 5 shows steps performed by a Section Validator in an example implementation, according to some embodiments.

FIG. 5 shows a method 500 performed by a section validator, such as the section validator 106, in accordance with some embodiments. It should be understood that the method steps are shown as a reference only and sequence of the method steps should not be construed as limitation. The method steps can include any additional steps in any order. Although, the method 500 may be implemented in any system, the example method 500 is provided in reference to the system 100 for ease of explanation.

The section validator 105 interacts with many other services for validating documentation section quality. At step 501, software component documentation and metadata is fetched from the project repository. To fetch the software component documentation and the metadata, the section validator connects with the project repository and downloads the project repository documentation. The project repository documentation is then processed to extract section headings in step 502. This step is followed by loading a pre-built standard structure model for validating section content and section headers in step 503. In step 504, the extracted section headings from step 502 is mapped to the loaded standard structure model from step 504. In step 505, the sections heading are validated against the loaded standard structure model. Once validated, the validated data is used to generate a relevancy score. In step 506 which is stored for further steps in calculating documentation quality.

Figure 6:
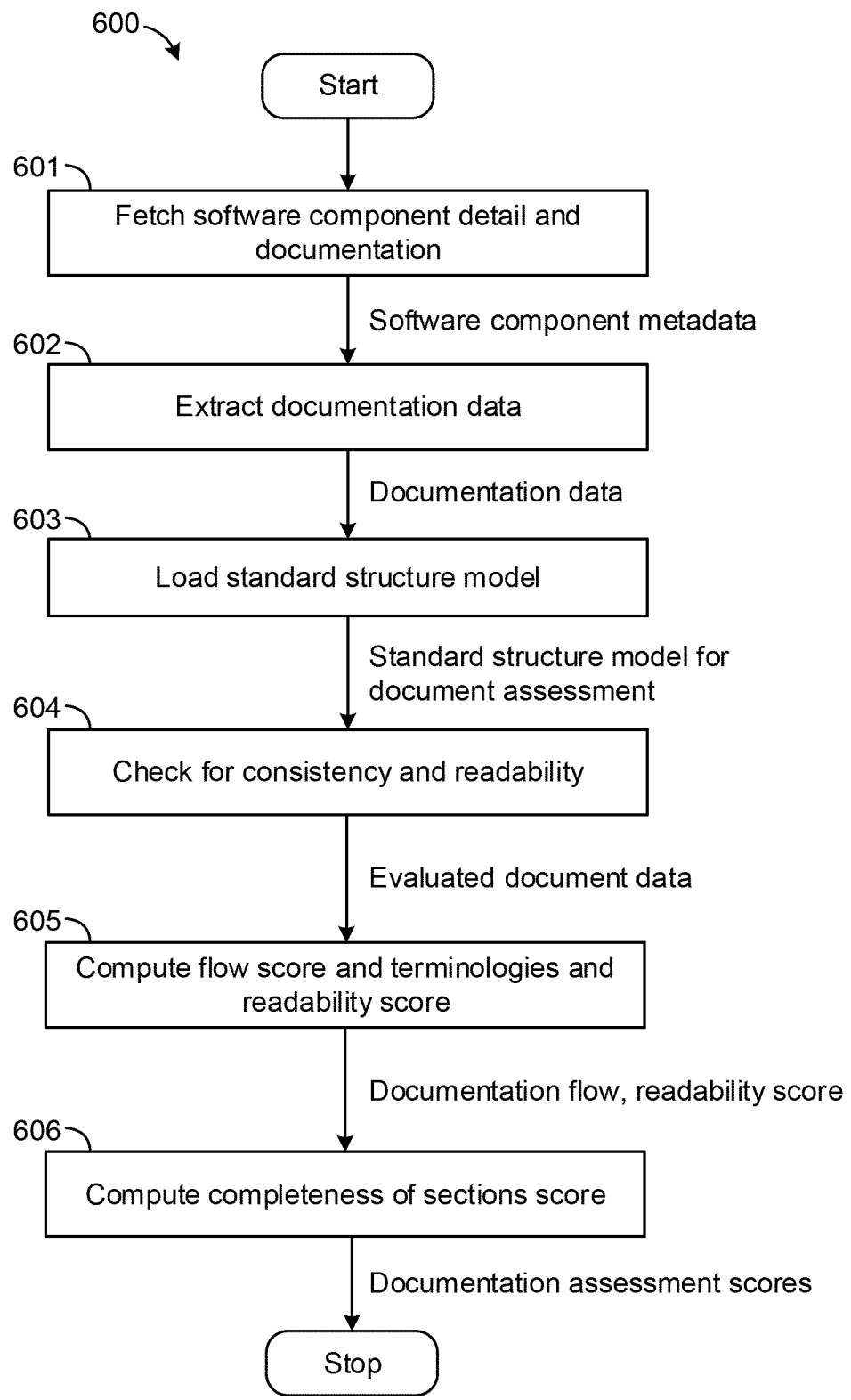
FIG. 6 shows the steps performed by a document assessor in an example implementation, according to some embodiments.

FIG. 6 shows a method 600 performed by, a document assessor, such as the document assessor 107, in accordance with some embodiments. It should be understood that the method steps are shown as a reference only and sequence of the method steps should not be construed as limitation. The method steps can include any additional steps in any order. Although, the method 600 may be implemented in any system, the example method 600 is provided in reference to the system 100 for ease of explanation.

The document assessor 107 interacts with many other services for assessing documentation quality. At step 601, the document assessor fetches the project repository metadata from the project repository. To fetch the project repository metadata, the document assessor connects with the project repository and downloads the project repository documentation. The project repository documentation is then processed to extract documentation data in step 602. This step is followed by loading a pre-built standard structure model for assessing documentation quality in step 603. In step 604, the documentation data from step 602 is checked for consistency of usage of terminologies and readability of the documentation. Natural language Processing (NLP) techniques are used in evaluating the readability of the document and analyzing the consistency of the terminologies of the documentation contents from step 602. In step 605, based on the readability and consistency of the usage of the terminologies of the documentation data, a terminologies and readability score and flow score are computed. After this, the documentation data is analyzed to check for completeness of expected sections and based on the levels of completeness, a completeness of sections score is computed in the step 606 which is stored for further steps in calculating documentation quality.

Figure 7:
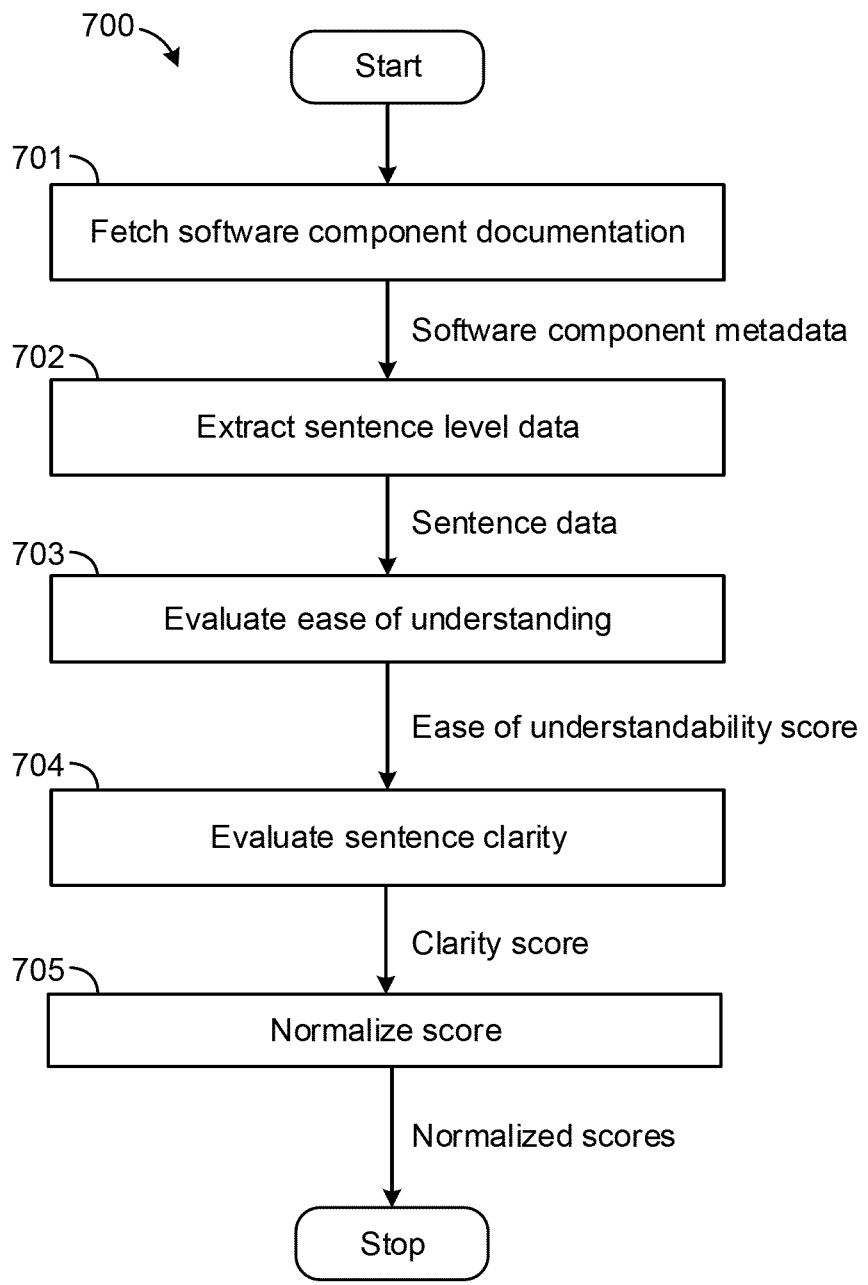
FIG. 7 shows steps performed by a language assessor in an example implementation, according to some embodiments.

FIG. 7 shows a method 700 performed by a language scorer 108, in accordance with some embodiments. It should be understood that the method steps are shown as a reference only and sequence of the method steps should not be construed as limitation. The method steps can include any additional steps in any order. Although, the method 700 may be implemented in any system, the example method 700 is provided in reference to the system 100 for ease of explanation.

The language scorer 108 interacts with many other services for assessing documentation quality. At step 701, software component documentation and metadata is received from the project repository. To fetch the documentation and metadata, the language scorer 108 connects with the project repository and downloads the project repository documentation. The project repository documentation is then processed to extract sentence level documentation data in step 702. The sentence level documentation data obtained is evaluated based on the ease of understanding criteria wherein an ease of understandability score is generated in step 703. In step 704, the sentence level documentation data from step 702 is evaluated based on sentence level language clarity and coherence using NLP techniques to evaluate the clarity of the document and the coherence of the sentence level documentation contents from step 702 is analyzed to generate a clarity score. In step 705, both the scores obtained from steps 703, 704 are combined and normalized to compute a normalized score which is stored for further steps in calculating documentation quality.

Figure 8:
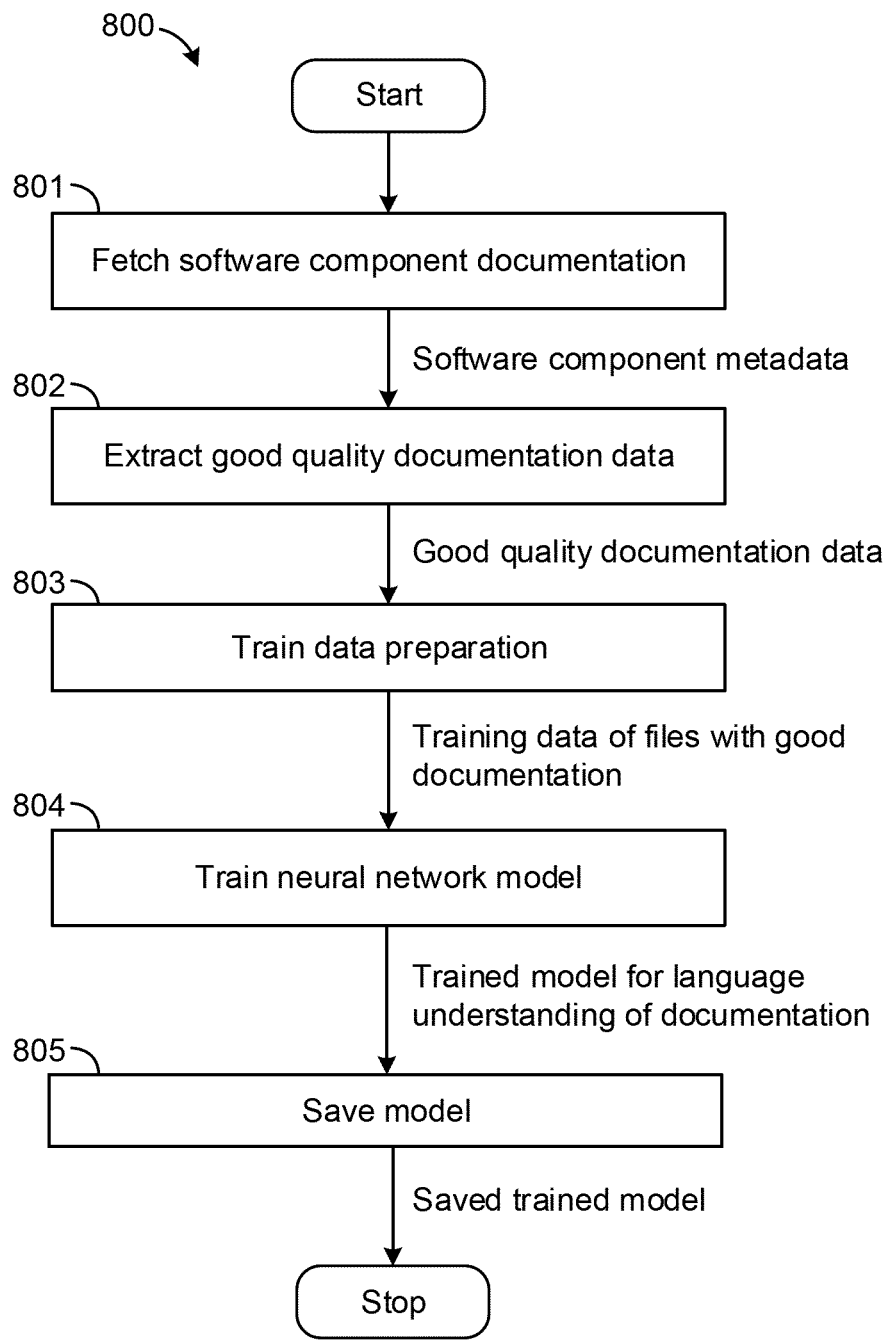
FIG. 8 shows steps performed by a Project Metrics Doc Builder in an example implementation, according to some embodiments.

FIG. 8 shows a method 800 performed by a project metrics doc builder, such as the project metrics doc builder 109, in accordance with some embodiments. It should be understood that the method steps are shown as a reference only and sequence of the method steps should not be construed as limitation. The method steps can include any additional steps in any order. Although, the method 800 may be implemented in any system, the example method 800 is provided in reference to the system 100 for ease of explanation.

The project metrics doc builder 109 interacts with many other services for preparing and training data for assessing documentation quality. At step 801, software component documentation and metadata is received the project repository. To receive the documentation and metadata, the project metrics doc builder connects with the project repository and downloads the documentation. The documentation from step 801 is then segregated to identify good quality documentations based on various criteria and human evaluation. The documents which are annotated to have good quality documentation are used in further steps to prepare a machine learning model for language understanding of documentation. The documentation data of the identified good quality documentation are extracted in step 802. In step 803, the extracted data are accumulated and prepared for training a machine learning model. The training data obtained from step 803 is used to train a neural network model in identifying the language correctness and language understanding of the documentation data in step 804. The trained ML model from step 804 is saved in the storage in step 805. The saved model from step 805 can be loaded and used for identifying and analyzing the language understanding of the documentation data.

Figure 9:
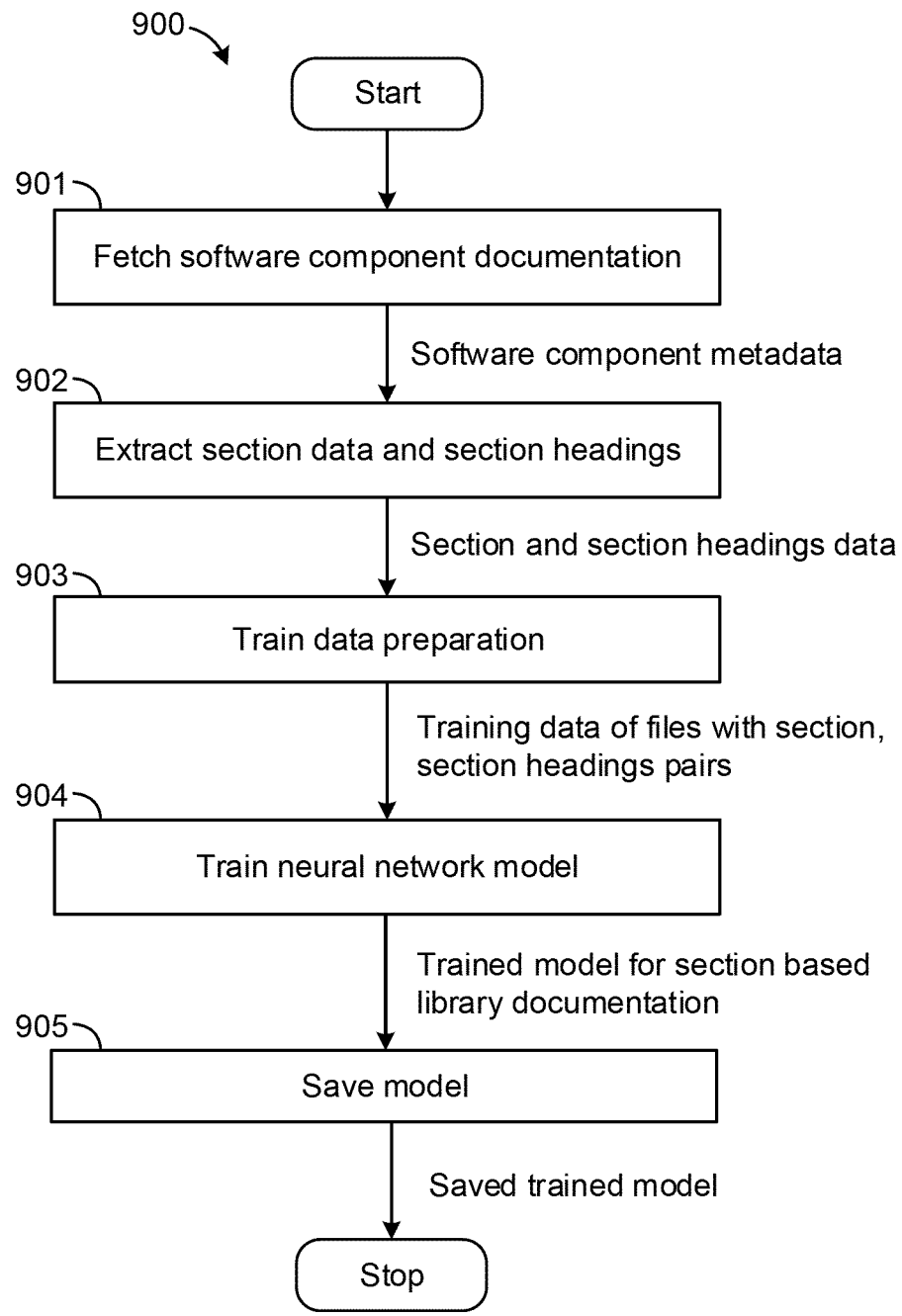
FIG. 9 shows steps performed by the Project Metrics Doc Builder in another example implementation, according to some embodiments.

FIG. 9 shows a method 900 performed by a project metrics doc builder, such as the project metrics doc builder 110, in accordance with some embodiments. It should be understood that the method steps are shown as a reference only and sequence of the method steps should not be construed as limitation. The method steps can include any additional steps in any order. Although, the method 900 may be implemented in any system, the example method 900 is provided in reference to the system 100 for ease of explanation.

The project metrics doc builder 110 interacts with many other services for preparing and training data for assessing documentation quality. At step 901 software component documentation and metadata is received from the project repository. To fetch the software documentation and metadata, the software project metrics doc builder 110 connects with the project repository and downloads the documentation. The documentation from step 901 is then segregated to extract section headings and section contents in step 902. In step 903, the extracted section level data are accumulated and prepared for training a machine learning Model. The training data comprises of section heading and section content pairs which serve as training data for the neural network model in step 903. The training data obtained from step 903 is used to train a neural network model in identifying the logical match of the contents of the section with respect to the corresponding section header in step 904. The trained ML model from step 904 is saved in the storage in step 905. The saved model from step 905 can be loaded and used for identifying and analyzing the language understanding of the documentation data.

Figure 10:
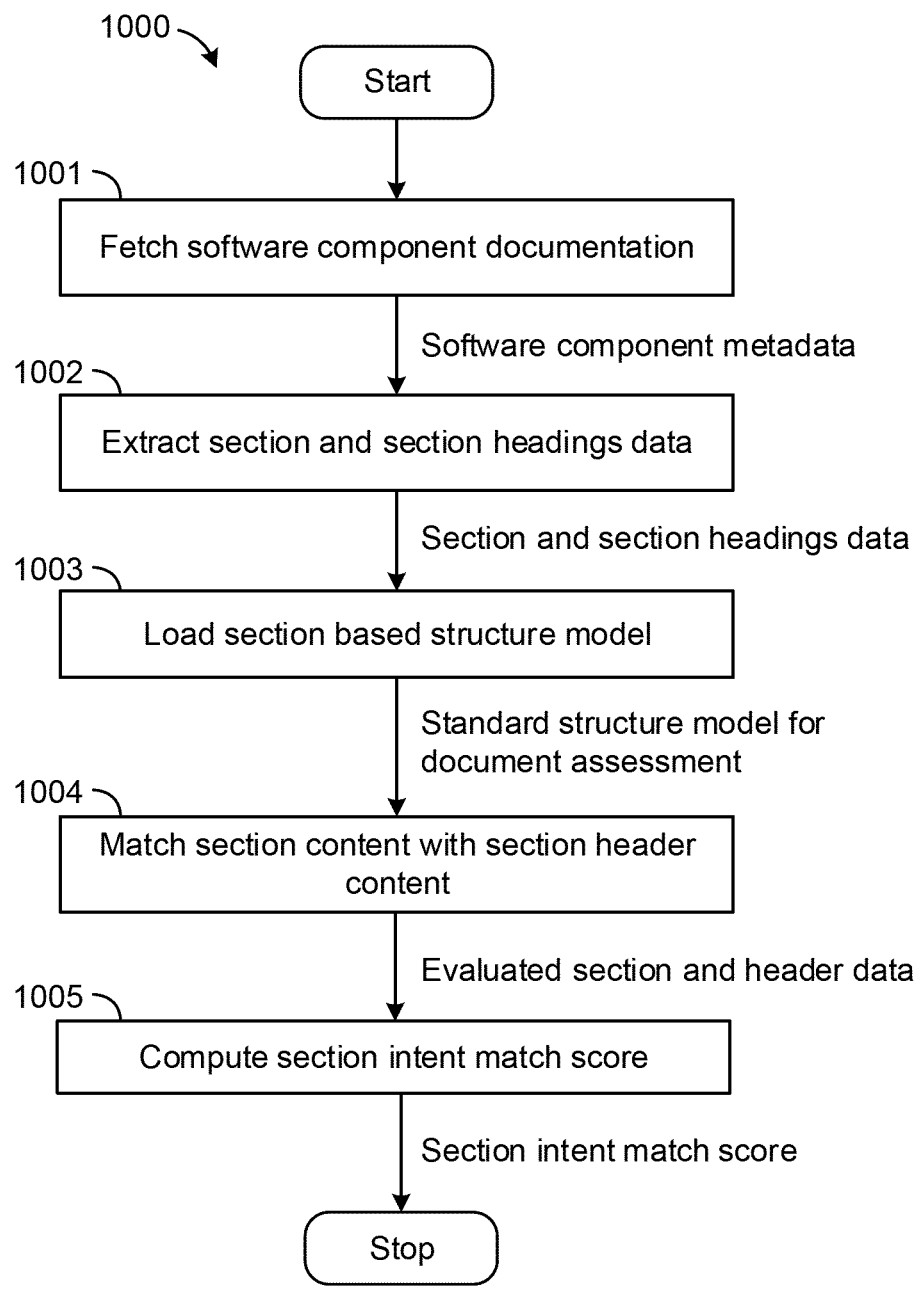
FIG. 10 shows steps performed by an Intent Predictor in an example implementation, according to some embodiments.

FIG. 10 shows a method 1000 performed by the intent predictor 111, in accordance with some embodiments. It should be understood that the method steps are shown as a reference only and sequence of the method steps should not be construed as limitation. The method steps can include any additional steps in any order. Although, the method 1000 may be implemented in any system, the example method 1000 is provided in reference to the system 100 for ease of explanation The intent predictor 111 interacts with many other services for assessing documentation quality. At step 1001, the documentation and metadata is received from the project repository. Further, to receive the documentation and metadata, the intent predictor 1001 connects with the project repository and downloads the project repository documentation. The project repository documentation from step 1001 is then segregated to extract section data and section headings in step 1002. In step 1003, a pre-trained machine learning model trained with section data and section headers data is loaded for identifying the extent of matching in the intent of a section header with the intent of the section data corresponding to that section header. In step 1004, the section content is matched with section header content making use of the machine learning model loaded in step 1003. In step 1005, an Intent match score is generated based on the extent of matching between the section headers data and the section content data identified in step 1004. The intent match score generated in step 1005 are used in calculating the documentation quality score.

Figure 11:
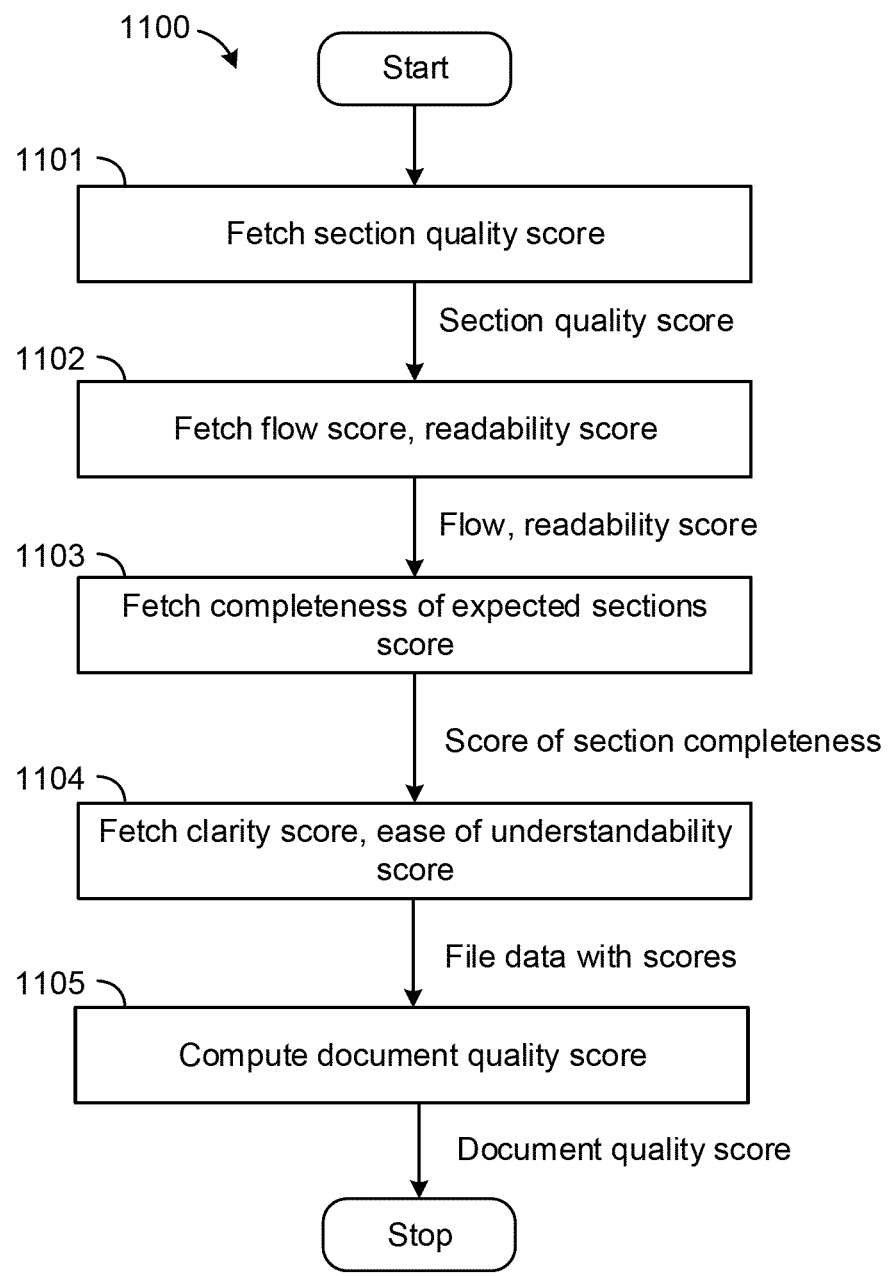
FIG. 11 shows steps involved in consolidating various scores from various services in an example implementation, according to some embodiments.

FIG. 11 shows a method 1100 involved in consolidating the various scores from various services by the doc quality scorer, e.g., doc quality scorer 104, in accordance with some embodiments. It should be understood that the method steps are shown as a reference only and sequence of the method steps should not be construed as limitation. The method steps can include any additional steps in any order. Although, the method 1100 may be implemented in any system, the example method 1100 is provided in reference to the system 100 for ease of explanation.

In step 1101, the section quality score calculated is fetched. In step 1102, the language analysis metrics including the flow score, terminologies and readability score are fetched. In step 1103, the completeness of expected section score is fetched. In step 1104, clarity score and ease of understandability score involving the language understanding metrics are fetched. The individual scores obtained from the steps 1101, 1102, 1103, 1104 are combined in step 1105 to compute a document quality score.

As will be appreciated by one of skilled in the art, the present disclosure may be embodied as a method and system. In the specification, there has been disclosed exemplary embodiments. Although specific terms are employed, they are used in a generic and descriptive sense only and not for purposes of limitation of the scope of the disclosure.

What is claimed is:

1. A system for determining and using a quality score of an open source software project documentation to build software applications, the system comprising:
   one or more processors and memory storing instructions that, when executed by the one or more processors, cause the one or more processors to perform operations comprising:
   extracting section data and language data from documentation of pre-validated open source software projects having known qualities;
   creating and training one or more machine learning models by running a machine learning algorithm that uses the section data, the language data, and the known qualities of pre-validated open source software projects as training data, wherein the one or more machine learning models are configured via the machine learning algorithm to assess qualities of open source software project documentation;

downloading open source software project code of an open source software project and documentation of the open source software project code;

analyzing the open source software project code and the documentation of the open source software project code;

parsing the documentation of the open source software project code into sections;

validating the sections of the documentation of the open source software project code with project or stack metrics;

assessing a quality of the sections of the documentation of the open source software project code by providing the sections of the documentation of the open source software project a first input to the one or more machine learning models and executing the one or more machine learning models to generate a section quality score based on the sections of the documentation of the open source software project code as a first output of the one or more machine learning models;

assessing a quality of language of the documentation of the open source software project code by providing the language of the documentation of the open source software project as a second input to the one or more machine learning models and executing the one or more machine learning models to generate a language quality score based on language of the documentation of the open source software project code as a second output of the one or more machine learning models;

computing, using the one or more machine learning models, the quality score of the documentation of the open source software project code based on the section quality score and the language quality score; and causing a software application to be built based on the quality score of the documentation of the open source software project code.

2. The system of claim 1, the operations further comprising:

creating a web form for accepting details of the open source software project, wherein the details include name and repository address of the open source software project;

receiving the details, a remote location uniform resource locator (URL) of the open source software project code, and the documentation of the open source software project code; and receiving a user email address for sending a notification of the quality score of the documentation of the open source software project code.

3. The system of claim 1, the operations further comprising:

reading, via natural language processing, the documentation of the open source software project code;

wherein assessing the quality of the sections of the documentation of the open source software project code comprises assessing each section of the documentation of the open source software project code to determine section quality scores for each section of the documentation of the open source software project code; and wherein the quality score of the documentation of the open source software project code is computed based on the section quality scores for all of the sections.

4. The system of claim 1, the operations further comprising:

preparing the training data from the documentation of the pre-validated open source software projects for different levels of documentation quality, the levels being a low quality, a medium quality, and a high quality, wherein sections of the documentation of the pre-validated open source software projects are mapped to a system defined standard structure model, and wherein the one or more machine learning models are trained using the training data.

5. The system of claim 1, the operations further comprising:

extracting a section heading of a section of the documentation of the open source software project code and mapping the section heading to a system defined standard structure model; and validating content of the section to map relevance of content of the section to expected content coverage of the section based on the section heading.

6. The system of claim 1, the operations further comprising:

assessing a flow of the documentation of the open source software project code and the sections of the documentation of the open source software project code by comparing the sections of the documentation of the open source software project code with pre-validated documentations to allot a flow score to the documentation of the open source software project code that indicates how well the documentation of the open source software project code is structured;

evaluating a consistency of usage of terminologies and a readability of the documentation of the open source software project code to allot a terminologies and readability score to the documentation of the open source software project code, the terminologies and readability score indicating the consistency of usage of terminologies and the readability of the documentation of the open source software project code; and evaluating completeness of the sections in the documentation of the open source software project code based on a system defined standard structure model to allocate a completeness of sections score to the documentation of the open source software project code, the completeness of sections score indicating a level of the completeness of the sections.

7. The system of claim 1, the operations further comprising:

evaluating sentences of the documentation of the open source software project code to determine an ease of understandability score of the documentation of the open source software project code, wherein the ease of understandability score indicates easiness in understating the documentation of the open source software project code;

evaluating the sentences to determine a clarity score of the documentation of the open source software project code, wherein the clarity score indicates a degree of clarity of subject matter of the documentation of the open source software project code; and normalize the ease of understandability score and the clarity score based on an expected content coverage of the sections.

8. The system of claim 1, the operations further comprising:
   analyzing the open source software project code of the open source software project to generate source code metrics; and
   wherein the one or more machine learning models are trained using the documentation of the pre-validated open source software projects and the source code metrics.

9. The system of claim 1, the operations further comprising:
   preparing the training data using the documentation of the pre-validated open source software projects under different sections, wherein the different sections are mapped to a system defined standard structure model and wherein the one or more machine learning models are trained using the training data.

10. The system of claim 1, the operations further comprising:
    pre-processing a section of the documentation of the open source software project code having a provided section heading;
    predicting a section category using the pre-processed section of the documentation of the open source software project code; and
    comparing the predicted section category with the provided section heading in the documentation of the open source software project code to calculate a section intent match score.

11. The system of claim 1, the operations further comprising:
    providing different software connectors to different sources of open source software project information; and
    providing database and file storage integration services for other processing services to fetch and write data.

12. A method of automatically determining a quality score of a documentation of an open source software project and using the quality score to build software applications, the method comprising:
    extracting section data and language data from documentation of pre-validated open source software projects having known qualities;
    creating and training one or more machine learning models by running a machine learning algorithm that uses the section data, the language data, and the known qualities of pre-validated open source software projects as training data, wherein the one or more machine learning models are configured via the machine learning algorithm to assess qualities of open source software project documentation;
    downloading open source software project code of an open source software project and documentation of the open source software project code;
    analyzing the open source software project code and the documentation of the open source software project code;
    parsing the documentation of the open source software project code into sections;
    validating the sections of the documentation of the open source software project code with project or stack metrics;
    assessing a quality of the sections of the documentation of the open source software project code by providing the sections of the documentation of the open source software project a first input to the one or more machine learning models and executing the one or more machine learning models to generate a section quality score based on the sections of the documentation of the open source software project code as a first output of the one or more machine learning models;
    assessing a quality of language of the documentation of the open source software project code by providing the language of the documentation of the open source software project as a second input to the one or more machine learning models and executing the one or more machine learning models to generate a language quality score based on language of the documentation of the open source software project code as a second output of the one or more machine learning models;
    computing, using the one or more machine learning models, the quality score of the documentation of the open source software project code based on the section quality score and the language quality score; and
    causing a software application to be built based on the quality score of the documentation of the open source software project code.

13. The method of claim 12 wherein downloading the open source software project code and the documentation of the open source software project code comprises:
    connecting to a source code repository and a documentation site of the documentation of the open source software project code;
    downloading source code of the open source software project and the documentation of the open source software project code; and
    validating the documentation of the open source software project code.

14. The method of claim 12, wherein analyzing the open source software project code and the documentation of the open source software project code further comprises:
    calculating software project source code metrics; and
    identifying a project technology stack.

15. The method of claim 14, wherein parsing the documentation of the open source software project code into sections comprises:
    identifying, via natural language processing, section headings and a section content of the documentation of the open source software project code; and
    mapping the sections to a system defined standard structure model for the identified project technology stack.

16. The method of claim 15, wherein validating the sections of the documentation of the open source software project code with the project or stack metrics comprises:
    fetching the system defined standard structure model for the identified project technology stack;
    comparing the parsed sections of the documentation of the open source software project code to a standard list;
    identifying mapping compliance; and
    scoring the documentation of the open source software project code for compliance to expected sections as per the system defined standard structure model.

17. The method of claim 12 wherein assessing the quality of the sections of the documentation of the open source software project code comprises:
    comparing content of a section to a corresponding section heading;
    evaluating a quality of the content of a section to determine a section quality score of section content;
    assessing a flow of the documentation of the open source software project code to determine a flow score of the documentation of the open source software project code, wherein the flow score indicates how well the documentation of the open source software project code is structured;

evaluating a consistency of usage of terminologies and readability in the documentation of the open source software project code to determine terminologies and readability score in the documentation of the open source software project code, wherein the terminologies and readability score indicates about consistency of usage of the terminologies and the readability of the documentation of the open source software project code; and evaluating completeness of expected sections to determine a completeness of expected sections score of the documentation of the open source software project code, wherein the completeness of expected sections score indicates a level of the completeness of the expected sections.

18. The method of claim 17, wherein assessing the quality of the language of the documentation of the open source software project code comprises:

evaluating sentences of the documentation of the open source software project code to determine an ease of understandability score of the documentation of the open source software project code, wherein the ease of understandability score indicates easiness in understating the documentation of the open source software project code;

evaluating the sentences to determine a clarity score, wherein the clarity score indicates a degree of clarity of subject matter of the documentation of the open source software project code; and normalizing the ease of understandability score and the clarity score based on an expected content coverage of the section.

19. The method of claim 18, wherein computing the quality score of the documentation of the open source software project code comprises:

fetching the section quality score, the flow score, the terminologies and readability score, the completeness of expected sections score, the ease of understandability score, and the clarity score; and consolidating the section quality score, the flow score, the terminologies and readability score, the completeness of expected sections score, the ease of understandability score, the clarity score with pre-defined weights to determine the quality score of the documentation of the open source software project code.

20. The method of claim 12, wherein assessing the quality of the language of the documentation of the open source software project code comprises:

evaluating sentences of the documentation of the open source software project code to determine an ease of understandability score of the documentation of the open source software project code, wherein the ease of understandability score indicates easiness in understating the documentation of the open source software project code;

evaluating the sentences to determine a clarity score, wherein the clarity score indicates a degree of clarity of subject matter of the documentation of the open source software project code; and normalizing the ease of understandability score and the clarity score based on an expected content coverage of the sections.

21. One or more non-transitory computer-readable media for determining a quality score of an open source software project documentation and using the quality score to build software applications, the computer-readable media storing instructions thereon, wherein the instructions when executed by one or more processors cause the one or more processors to:

extract section data and language data from documentation of pre-validated open source software projects having known qualities;

create and train one or more machine learning models by running a machine learning algorithm that uses the section data, the language data, and the known qualities of pre-validated open source software projects as training data, wherein the one or more machine learning models are configured via the machine learning algorithm to assess qualities of open source software project documentation;

download open source software project code and documentation of the open source software project code;

analyze the open source software project code and the documentation of the open source software project code;

parse the documentation of the open source software project code into sections;

validate the sections of the documentation of the open source software project code with project or stack metrics;

assess a quality of the sections of the documentation of the open source software project code by providing the sections of the documentation of the open source software project a first input to the one or more machine learning models and executing the one or more machine learning models to generate a section quality score based on the sections of the documentation of the open source software project code as a first output of the one or more machine learning models;

assess a quality of language of the documentation of the open source software project code by providing the language of the documentation of the open source software project as a second input to the one or more machine learning models and executing the one or more machine learning models to generate a language quality score based on language of the documentation of the open source software project code as a second output of the one or more machine learning models;

compute, using the one or more machine learning models, the quality score of the documentation of the open source software project code based on the section quality score and the language quality score; and cause a software application to be built based on the quality score of the documentation of the open source software project code.

* * * * *